United States Patent [19]

Teramoto et al.

[11] Patent Number: 4,687,803

[45] Date of Patent: Aug. 18, 1987

[54] DIELECTRIC FILMS COMPRISING STRETCHED FILMS OF VINYLIDENE FLUORIDE AND PORCELAIN PARTICLES

[75] Inventors: Yoshikichi Teramoto; Ke ichi Nakamura; Naohiro Murayama, all of Iwaki, Japan

[73] Assignee: Kureha Kagaku Kogyo Kabushiki Kaisha, Tokyo, Japan

[21] Appl. No.: 879,823

[22] Filed: Jun. 26, 1986

Related U.S. Application Data

[63] Continuation of Ser. No. 733,128, May 10, 1985, abandoned, which is a continuation of Ser. No. 551,290, Nov. 14, 1983, abandoned, which is a continuation-in-part of Ser. No. 434,464, Oct. 14, 1982, abandoned.

[30] Foreign Application Priority Data

Oct. 12, 1981 [JP] Japan ................................ 56-168072

[51] Int. Cl.$^4$ .......................... H01G 4/00; C08K 3/08
[52] U.S. Cl. .................................... 524/413; 524/431; 524/545
[58] Field of Search ........................ 524/431, 413, 545

[56] References Cited

U.S. PATENT DOCUMENTS 3,551,197  12/1970  Lindquist ............................ 117/217

FOREIGN PATENT DOCUMENTS

2044/1980  1/1980  Japan .
134806/1982  8/1982  Japan .

*Primary Examiner*—Herbert J. Lilling
*Attorney, Agent, or Firm*—Woodcock Washburn Kurtz Mackiewicz & Norris

[57] ABSTRACT

A dielectric film is a stretched body of a composition comprising a thermoplastic resin cross-linked to have a gel content of about 10 to about 75%, and finely divided dielectric porcelain particles dispersed in the thermoplastic resin. Stretching does not result in a decrease in the dielectric constant of the film and provides a great electrostatic capacitance. The dielectric film is manufactured by a method comprising the steps of cross-linking the thermoplastic resin of the composition containing the dielectric porcelain particles as well, and stretching the composition at a predetermined temperature selected in association with the thermoplastic resin.

6 Claims, No Drawings

DIELECTRIC FILMS COMPRISING STRETCHED FILMS OF VINYLIDENE FLUORIDE AND PORCELAIN PARTICLES

CROSS-REFERENCES TO RELATED APPLICATIONS

This is a continuation of application Ser. No. 733,128, filed May 10, 1985, now abandoned, which is a continuation of application Ser. No. 551,290, filed Nov. 14, 1983, now abandoned, which is a Continuation-In-Part of application Ser. No. 434,464, filed on Oct. 14, 1982, now abandoned, entitled "Dielectric Films and Method for manufacturing the same".

BACKGROUND OF THE INVENTION

1. Field of the Invention

The present invention relates to a dielectric film and a method for manufacturing the same, and more particularly, to a dielectric film comprising a thermoplastic resin and finely divided dielectric porcelain particles and a method for manufacturing the same.

2. Brief Description of the Prior Art

A thermoplastic resin formed body with finely divided dielectric porcelain particles dispersed therein is known as a dielectric body which has a high dielectric constant and excellent formability. Such a formed body can be easily prepared in the form of a thin film which has a relatively great dielectric constant and hence a relatively great electrostatic capacitance.

For example, Netherland Pat. No. 7,105,397 discloses unstretched thermoplastic moulding materials comprising thermoplastic resins and barium titanate, and U.S. Pat. No. 4,010,133 describes an unstretched dielectric film comprising an internally plasticized thermosetting resin and dielectric particles dispersed in the crosslinked polymer.

Also, composite films of finely divided porcelain particles and polyvinylidene fluoride which are neither cross-lined nor stretched are disclosed by, for example, T. Yamada et al (Chem. Abstract 97-32074 (1982)) and E. Fukada et al (Chem. Abstract 88-144926 (1978)).

Other materials which may be used for dielectric film but do not contain dielectric porcelain particles are discribed by Mateev, K. V. at al (Chem. Abstract 76-15101 (1972)) who teach crosslinking of polyvinylidene fluoride, and by Wang, T. T. (Chem. Abstract 97-73294 (1982)) who teaches polyvinylidene fluoride films having improved thermal stability associated with the formation of crosslinks in the polymer.

However, with the recent trend toward smaller capacitors for more compact electric equipment, the electrostatic capacitance obtainable with the materials as described above is not yet satisfactory. A dielectric film which has greater electrostatic capacitance is desired.

One method of achieving this is to make a formed body into a thinner film. However, in a formed body of a composite system containing a thermoplastic resin and finely divided dielectric porcelain particles, stretching results in a reduced dielectric constant.

OBJECTS AND SUMMARY OF THE INVENTION

Therefore, an object of the present invention is to provide a dielectric film whose dielectric constant may not be decreased upon stretching and a method for manufacturing the same.

It is another object of the present invention to provide a dielectric film having a great electrostatic capacitance and a method for manufacturing the same.

According to a hypothesis of the present inventors, a decrease in the dielectric constant upon stretching is attributable to formation of voids between the thermoplastic resin and finely divided dielectric porcelain particles. Working on this hypothesis, the present inventors established that the formation of such voids may be prevented and the decrease in the dielectric constant may thus be prevented by taking the following measures. First, the resin is cross-linked. Second, if the resin is a crystalline polymer, it is stretched at a temperature which is higher than a temperature about 20° C. lower than the melting point of the resin. If the resin is an amorphous polymer, it is stretched at a temperature which is higher than the glass transition point of the resin. The present invention has thus been established.

According to an aspect of the present invention, a dielectric film comprises a stretched body of a composition of a thermoplastic resin cross-linked to have a gel content of about 10 to about 75% and finely divided dielectric porcelain particles dispersed in the thermoplastic resin.

According to another aspect of the present invention, a method for manufacturing a dielectric film comprises the steps of cross-linking a thermoplastic resin of a composition in which finely divided dielectric porcelain particles are dispersed in the thermoplastic resin; and stretching the composition at a temperature which is higher than a temperature about 20° C. lower than the melting point of the thermoplastic resin and which is lower than the decomposition initiation temperature thereof if the thermoplastic resin is a crystalline polymer, or stretching the composition at a temperature which is higher than the glass transition point of the thermoplastic resin and which is lower than the decomposition initiation temperature thereof if the thermoplastic resin is an amorphous polymer.

BRIEF DESCRIPTION OF THE DRAWINGS

The drawing is a schematic front view of an example of a stretching machine which may be used in the method for manufacturing a dielectric film according to the present invention.

DETAILED DESCRIPTION OF THE PREFERRED EMBODIMENTS

A dielectric film of the present invention can be prepared by dispersing finely divided dielectric porcelain particles in a thermoplastic resin, cross-linking the thermoplastic resin such that the thermoplastic resin has a gel content of about 10 to about 75%, and stretching the composition.

Examples of the thermoplastic resin may include crystalline polymers (i.e. those for which crystalline peaks can be observed by X-ray diffraction) such as polyethylene, polypropylene or vinylidene fluoride resin; or amorphous polymers (i.e. those for which no crystalline peaks can be observed by X-ray diffraction) such as polyvinyl chloride. However, since the dielectric constant of a formed body of the dielectric film largely depends upon that of the thermoplastic resin, a thermoplastic resin having a great dielectric constant such as vinylidene fluoride resin is particularly preferable. By the term "vinylidene fluoride resin" are meant not only vinylidene fluoride homopolymers (hereinafter referred to as PVDF for brevity) but also copolymers each of which contains vinylidene fluoride in the amount of more than about 50 mol%, preferably more than about 70 mol%, and more preferably more than about 80 mol%, and one or more of comonomers which may be copolymerized with vinylidene fluoride, such as fluorine-containing olefins, e.g., vinyl fluoride, trifluoroethylene, chlorofluorovinylidene, trifluorochloroethylene, tetrafluoroethylene, or hexafluoropropylene.

Examples of a cross-linking agent to be added to the thermoplastic resin as needed may include cyanurates such as triallyl cyanurate, diallyl monopropargyl cyanurate, dipropargyl monoallyl cyanurate, or tripropargyl cyanurate; isocyanurates such as triallyl isocyanurate, tripropargyl isocyanurate, dipropargyl allyl isocyanurate, or diallyl propargyl isocyanurate; triacryl formal; triallyl trimellitate; trimethylolpropane trimethacrylate; ethylene glycol dimethacrylate; and so on. However, other known cross-linking agents may also be used.

The thermoplastic resin as described above may be cross-linked by any known method. For example, there may be adopted a method for cross-linking thermoplastic resin by radiation; a method for cross-linking a thermoplastic resin by radiation after adding a cross-linking agent to and dispersing finely divided dielectric porcelain particles in the thermoplastic resin; or a chemical cross-linking method by optionally heating.

The degree of cross-linking is selected such that the gel content after cross-linking is about 10 to about 75%, preferably about 20 to about 65%, and more preferably about 35 to about 60%. If the gel content is too small, the resin flows during stretching, and uniform stretching may not be performed. Then, film formation may not be performed, or a stretched body may not have uniform properties. On the other hand, if the gel content is too great, cross-linking progresses too far, also impairing film formation. The "gel content" used in this specification is the ratio in % of the amount of the gelled portion obtained after extraction with a good solvent, or non-cross-linked portion of the thermoplastic resin remaining after cross-linking to the amount of the resin before extraction. The extraction temperature needs to be such that the solvent solvates with the thermoplastic resin. The extraction time is 24 hours. For example, if the vinylidene fluoride resin is used as the thermoplastic resin, dimethylacetamide is used as the solvent and extraction is performed at 100° C. to determined the gel content.

Examples of finely divided dielectric porcelain particles to be mixed with the thermoplastic resin include finely divided ferroelectric porcelain particles having the perovskite crystal structure such as those of barium titanate, lead titanate, or titanium lead zirconate. However, other finely divided dielectric particles such as $TiO_2$ and $ZrO_2$ may also be used.

The average particle size measured by sedimentation method using as an instrument Micron Photo Sizer, Model SKN-1000 (manufactured by Nihon Seishin Kigyo) of the dielectric porcelain particles to be used is within the range of about 0.01 $\mu$m to 10 $\mu$m and preferably about 0.02 $\mu$m to about 6 $\mu$m. If the average particle size is greater than the upper limit, a thin film may not be formed. Even if a thin film can be formed, dielectric strength is degraded. If the average particle size is smaller than the lower limit, the viscosity of the composition in the molten state becomes too great, resulting in poor workability.

The finely divided dielectric porcelain particles may be added to the resin in any amount as long as they are dispersed in a resultant dielectric film. However, the finely divided dielectric porcelain particles are added preferably in the amount of about 5 to about 60% by volume, more preferably about 7 to about 40% by volume and most preferably aout 10 to about 30% by volume. If the amount of the dielectric porcelain particles exceeds the upper limit, formability is degraded, and the dielectric constant tends to be decreased upon stretching. If the amount of the dielectric porcelain particles is less than the lower limit, the dielectric constant becomes too small.

The dielectric film according to the present invention may contain finely divided conductive particles and other components in addition to the thermoplastic resin and the finely divided dielectric porcelain particles. Especially when finely divided conductive particles are added, a still greater dielectric constant is obtained, and the volume resistivity significantly increases upon stretching. Examples of the finely divided conductive particles include carbon blacks such as acetylene black or furnace black; or metal powders such as those of iron, nickel or aluminum. The arithmetic mean size of the finely divided conductive particles is preferably within the range of about 0.01 $\mu$m to 4 $\mu$m and more preferably about 0.05 $\mu$m to 2 $\mu$m. The finely divided conductive particles may be added to the composition in the amount of less than about 10% by volume and preferably less than about 6% by volume of the total volume of the resultant dielectric film. If the amount of the conductive particles added is above this critical value, the volume resistivity becomes too small although it may slightly increase upon stretching.

The cross-linked thermoplastic resin is stretched during or after cross-linking.

Stretching may be performed by any known stretching method such as uniaxial stretching, biaxial stretching or rolling. Other methods may also be adopted such as an inflation method in which one end of a tubular fomed body is sealed and an inert gas such as air or nitrogen is supplied under pressure from the other end of the tubular fomed body to stretch it; or a blowing method in which a sheet-shaped formed body is fixed to the periphery of one end of a cylinder and a gas under pressure is supplied from the other end of the cylinder to stretch the sheet-shaped formed body.

The stretching temperature is a temperature which is higher than a temperature about 20° C. lower than the melting point (the term "melting point" used herein indicates by definition a temperature at which an endothermic peak by melting appears on a curve obtained by a differential scanning calorimeter at a heating rate of 8° C./min.) of a thermoplastic resin used and which is lower than the decomposition initiation temperature thereof if the resin is a crystalline polymer, or is a temperature which is higher than the glass transition point of a thermoplastic resin used and which is lower than the decomposition initiation temperature thereof if the resin is an amorphous polymer. In order to facilitate stretching process, if the resin is a crystalline polymer, stretching is preferably performed at a temperature higher than the melting point of the resin and more preferably at a temperature aobut 10° C. higher than the melting point of the resin. When the composition is stretched at a high temperature after cross-linking the thermoplastic resin, the thermoplastic resin surrounds the finely divided dielectric particles in the form of a network to provide a uniform film.

A method for manufacturing a dielectric film according to the present invention comprises the steps of cross-linking a thermoplastic resin of a composition in which finely divided dielectric porcelain particles are dispersed in the thermoplastic resin; and stretching the composition at a temperature which is higher than a temperature about 20° C. lower than the melting point of the thermoplastic resin and which is lower than the decomposition initiation temperature thereof if the thermoplastic resin is a crystalline polymer, or stretching the composition at a temperature which is higher than the glass transition point of the thermoplastic resin and which is lower than the decomposition initiation temperature thereof if the thermoplastic resin is an amorphous polymer.

A dielectric film prepared by the method of the present invention has excellent properties compared to those prepared by the conventional methods. For example, with a dielectric film of the present invention, stretching does not cause a reduction in the dielectric constant. Moreover, the dielectric film has an electrostatic capacitance which is high enough to manufacture a compact capacitor.

The present invention will now be described by way of its examples. However, it is to be understood that the present invention is not limited to these particular examples.

EXAMPLE 1

A PVDF (trade name: KF#1000; a product manufactured by Kureha Kagaku Kogyo K.K.) and a barium titanate (trade name: BT-204; average particle size: 1.5 $\mu$m; a product manufactured by Fuji Titan Kogyo K.K.) were milled with a heated roller at 180° C. in the volume ratio of 73:27. Two parts by weight of triallyl isocyanurate as a cross-linking agent for the PVDF for 100 parts by weight of the PVDF were also added during milling. The resultant rolled sheet was formed by a hot press at 240° C. into a pressed sheet of a disc-shape having a thickness of 100 $\mu$m and a diameter of 6 cm. The pressed sheet was irradiated with $\gamma$-rays at a dose of 4 Mrad to cross-link the PVDF. The pressed sheet had a gel content of 57%. The gel content was measured fom the undissolved portion of the sheet after dissolving it in dimethylacetamide at 100° C. for 2 hours. The pressed sheet was stretched at 200° C. by using an apparatus as shown in the accompanying drawing and in various stretch ratios as shown in Table 1 below.

Explaining the apparatus and method for stretching, a sample 1 formed in a disc shape was clamped between a metal ring 3 and a metal cylinder 4 through ring-shaped silicone packings 2a and 2b, and the overall structure was clamped with clamps 5. An inert gas such as air or nitrogen was introduced under pressure in the direction indicated by arrow A to stretch the sample 1.

Aluminum was vacuum-deposited on both sides of each of stretched and non-stretched films. A signal of 1 KHz was applied to the aluminum electrodes thus formed to measure dielectric constant $\epsilon$ at ambient temperature. A voltage of 100 V D.C. was applied at ambient temperature to measure volume resistivity $\rho$ after 1 minute. The results obtained are shown in Table 1 below.

TABLE 1

| | $\epsilon$ | $\rho(\Omega \cdot cm)$ | Thickness ($\mu$m) | Stretch* ratio | Electrostatic capacitance (pF/cm$^2$) |
|---|---|---|---|---|---|
| Pressed sheet | 21.9 | $10^{13-14}$ | 100 | | 194 |
| Stretched film 1 | 37.9 | $10^{13-14}$ | 13 | 7.69 | 2580 |
| Stretched film 2 | 39.6 | $10^{13-14}$ | 11.5 | 8.70 | 3050 |
| Stretched film 3 | 40.5 | $10^{13-14}$ | 10.8 | 9.26 | 3320 |

*Stretch ratio was determined from thickness.

EXAMPLE 2

The same PVDF and barium titanate as in Example 1 and a carbon black (trade name: Denka black; average prticle size: 0.4 $\mu$m; a product manufactured by Denki Kagaku Kogyo K.K.) were milled with a heated roller in the volume ratio of 69:25:6 in the same manner as in Example 1. Two parts by weight of triallyl isocyanurate for 100 parts by weight of the PVDF were also added during milling. The resultant rolled sheet was pressed with a hot press, was cross-linked by irradiation with $\gamma$-rays, and was stretched. Various properties of the sheets obtained in this Example are shown in Table 2 below.

TABLE 2

| | $\epsilon$ | $\rho(\Omega \cdot cm)$ | Thickness ($\mu$m) | Stretch ratio | Electrostatic capacitance (pF/cm$^2$) |
|---|---|---|---|---|---|
| Pressed sheet | 41.1 | $10^{8-9}$ | 98 | | 371 |
| Stretched film 4 | 56.9 | $10^{13-14}$ | 26.0 | 3.77 | 1940 |
| Stretched film 5 | 55.6 | $10^{13-14}$ | 23.5 | 4.17 | 2090 |
| Stretched film 6 | 50 | $10^{13-14}$ | 20.0 | 4.90 | 2210 |

EXAMPLE 3

The same PVDF as in Example 1 and powders (average particle size: 5 $\mu$m) obtained as barium titanate by thermally decomposing barium titanyl oxalate (BaTiO(C$_2$O$_4$)$_2$·4H$_2$O) at 975° C. were milled in the volume ratio of 73:27 with a heated roller in the same manner as in Example 1. Two parts by weight of triallyl isocyanurate for 100 parts by weight of the PVDF were also added during milling. The resultant rolled sheet was pressed with a hot press, was cross-linked by irradiation with $\gamma$-rays, and was stretched. Various properties of the sheets obtained in this Example are shown in Table 3 below.

TABLE 3

| | $\epsilon$ | $\rho(\Omega \cdot cm)$ | Thickness ($\mu$m) | Stretch ratio | Electrostatic capacitance (pF/cm$^2$) |
|---|---|---|---|---|---|
| Pressed sheet | 36.9 | $10^{13-14}$ | 115 | | 317 |
| Stretched sheet 7 | 67.0 | $10^{13-14}$ | 19 | 6.1 | 3143 |
| Stretched | 148.0 | $10^{11-12}$ | 9 | 12,8 | 14550 |

TABLE 3-continued

| | $\epsilon$ | $\rho(\Omega \cdot cm)$ | Thickness ($\mu$m) | Stretch ratio | Electrostatic capacitance (pF/cm$^2$) |
| --- | --- | --- | --- | --- | --- |
| sheet 8 | | | | | |

EXAMPLE 4

The same PVDF as in Example 1 and powders (particle size distribution: 1 $\mu$m to 15 $\mu$m; average particle size: 6 $\mu$m) obtained by calcinating a barium titanate (trade name: BT-206; a product manufactured by Fuji Titan Kogyo K.K.) at 1,400° C., pulverizing the barium titanate and screening it through a sieve of 635 mesh (20 $\mu$m) were milled in the volume ratio of 73:27 with a heated roller as in Example 1. Two parts by weight of triallyl isocyanurate for 100 parts by weight of the PVDF were also added during milling. The resultant rolled sheet was pressed with a hot press, was cross-linked with $\gamma$-rays and was stretched. Various properties of the resultant sheets are shown in Table 4 below.

TABLE 4

| | $\epsilon$ | $\rho(\Omega \cdot cm)$ | Thickness ($\mu$m) | Stretch ratio | Electrostatic capacitance (pF/cm$^2$) |
| --- | --- | --- | --- | --- | --- |
| Pressed sheet | 26.7 | $10^{12-13}$ | 178 | | 133 |
| Stretched film 9 | 61.4 | $10^{12-13}$ | 17.5 | 10.0 | 3107 |
| Stretched film 10 | 72.0 | $10^{12-13}$ | 14.5 | 12.1 | 4391 |
| Stretched film 11 | 106.0 | $10^{12-13}$ | 10 | 17.5 | 9389 |

In the exmaples described above, the dielectric constant $\epsilon$ of the films which are obtained by stretching the composition in the molten state is greater than that of the pressed sheet. This is considered to be attributable to the fact that stretching of the sheet in the molten state minimizes formation of voids and orientation of the carbon black particles and also results in an increase in the dielectric constant of the matrix, considering the fact that the dielectric constant of a composite material is largely dependent on the dielectric constant of the thermoplastic resin which is a matrix.

EXAMPLE 5

The same PVDF as in Example 1 and powders (average particle size: 4 $\mu$m) obtained as barium titanate by thermally decomposing barium-strontium titanyl oxalate (Ba$_{0.75}$Sr$_{0.25}$TiO(C$_2$O$_4$)$_2$.4H$_2$O) at 1000° C. were milled in the volume ratio of 73:27 with a heated roller in the same manner as in Example 1. Two parts by weight of triallyl isocyanurate for 100 parts by weight of the PVDF were also added during milling. The resultant rolled sheet was pressed with a hot press, was cross-linked by irradiation with $\gamma$-rays, and was stretched. Various properties of the sheets obtained in this Example are shown in Table 5 below.

TABLE 5

| | $\epsilon$ | $\rho(\Omega \cdot cm)$ | Thickness ($\mu$m) | Stretch ratio | Electrostatic capacitance (pF/cm$^2$) |
| --- | --- | --- | --- | --- | --- |
| Pressed sheet | 40.7 | $10^{13-14}$ | 156 | | 231 |
| Stretched film 12 | 84.5 | $10^{12-13}$ | 16 | 9.8 | 4674 |
| Stretched film 13 | 130.0 | $10^{12-13}$ | 12 | 13.0 | 9588 |

COMPARATIVE EXAMPLE 1

The same PVDF and the barium titanate as in Example 1 were milled in the volume ratio of 73:27 with a heated roller. The rolled sheet was pressed with a hot press into a sheet of 190 $\mu$m thickness. The sheet was uniaxially stretched at 150° C. in a stretch ratio of 3.8.

The dielectric constants $\epsilon$ of the resultant sheet and film measured in the same manner as in Example 1 are shown in Table 6 below.

TABLE 6

| | $\epsilon$ | Thickness ($\mu$m) |
| --- | --- | --- |
| Pressed sheet | 20.0 | 192 |
| Uniaxially stretched film | 13.9 | 33 |

As can be seen from the above description, cold stretching results in a decrease in the dielectric constant. However, according to the method of the present invention, the dielectric constant is increased, and an exceedingly great electrostatic capacitance is obtained by making a film thinner.

What is claimed is:

1. A dielectric film comprising a stretched body of a composition consisting essentially of a vinylidene fluoride resin cross-linked to have a gel content of about 10 to about 75% and dispersed in the vinylidene fluoride resin, finely divided dielectric porcelain particles having the average particle size of 0.01 $\mu$m to 10 $\mu$m in an amount of from about 5 to about 60% by volume based on the total volume of the composition, the dielectric constant of said stretched film being at least as great as that of the unstretched film.

2. A dielectric film according to claim 1, wherein the composition contains the finely divided porcelain particles in the amount of from about 10 to about 40% by volume based on the total volume of the composition.

3. A dielectric film according to claim 1, wherein the finely divided porcelain particles have an average particle size of 0.2 $\mu$m to 6 $\mu$m.

4. A dielectric film according to claim 1, wherein the composition contains the finely divided porcelain particles having an average particle size of 0.02 $\mu$m to 6 $\mu$m in the amount of about 10 to about 40% by volume based on the total volume of the composition.

5. A dielectric film according to claim 1, wherein the vinylidene fluoride resin has a gel content of from about 20 to about 65%.

6. The dielectric film according to claim 1, 2, 3, 4 or 5 adapted to function as a capacitor.

* * * * *